US009499340B2

(12) United States Patent
Vardanyan

(10) Patent No.: US 9,499,340 B2
(45) Date of Patent: Nov. 22, 2016

(54) GRAVITY CONVEYOR

(71) Applicants: Armen Vardanyan, Yerevan (AM); Vladimir Arutyunyan, Yerevan (AM)

(72) Inventor: Armen Vardanyan, Yerevan (AM)

( * ) Notice: Subject to any disclaimer, the term of this patent is extended or adjusted under 35 U.S.C. 154(b) by 0 days.

(21) Appl. No.: 14/389,926

(22) PCT Filed: Mar. 7, 2013

(86) PCT No.: PCT/AM2013/000003
§ 371 (c)(1),
(2) Date: Oct. 1, 2014

(87) PCT Pub. No.: WO2013/155539
PCT Pub. Date: Oct. 24, 2013

(65) Prior Publication Data
US 2015/0298908 A1  Oct. 22, 2015

(30) Foreign Application Priority Data

Apr. 16, 2012  (AM) .................................. 20120062

(51) Int. Cl.
*B65G 11/06* (2006.01)
*B65G 21/18* (2006.01)
(52) U.S. Cl.
CPC ............ *B65G 11/063* (2013.01); *B65G 21/18* (2013.01)

(58) Field of Classification Search
CPC ............................. B65G 11/06; B65G 11/063
USPC ................. 193/12; 198/346.1, 346.2, 346.3; 52/175
See application file for complete search history.

(56) References Cited

U.S. PATENT DOCUMENTS

| 1,472,031 | A | * | 10/1923 | Lancaster ................ E04H 6/10 52/175 |
| 4,848,537 | A | | 7/1989 | Richards et al. |
| 5,901,827 | A | | 5/1999 | Belz et al. |
| 6,702,099 | B2 | * | 3/2004 | Otaguro ............ H01L 21/67706 198/346.3 |
| 2008/0184552 | A1 | | 8/2008 | Lang |
| 2011/0259713 | A1 | | 10/2011 | Glass et al. |

FOREIGN PATENT DOCUMENTS

DE    200410051479    4/2006

* cited by examiner

*Primary Examiner* — William R Harp
(74) *Attorney, Agent, or Firm* — Michael J. Feigin, Esq.; Feigin & Fridman

(57) ABSTRACT

A gravity conveyer, including an inlet, an outlet, a multi-loop spiral belt connecting the inlet and the outlet, the belt being installed around a vertical axis and designed as a ferroconcrete surface, each loop of the belt being square shaped, a plurality of gravity driven carts movable along the belt, a plurality of overhead manipulators detached from the carts and mounted on the belt, a first guide formed on a lower surface of the belt and defining a travel route for the overhead cart manipulators, a second guide formed on an upper surface of the belt and defining a travel route for the carts, and a plurality of stations, located along the belt along the second guide such that the carts and the overhead manipulators can arrive at the stations.

10 Claims, 3 Drawing Sheets

B-B

C-C

GRAVITY CONVEYOR

TECHNICAL FIELD

The invention relates to industrial means of transportation, in particular, to gravity conveyors.

BACKGROUND ART

The known solution has the following disadvantages:
the conveyer belt is movable which reduces durability of the conveyer and leads to extra power consumption;
the conveyer is not suitable to perform any treatment of the load transported on the belt (e.g. assemble, process, etc.), as required by the technology.

SUMMARY OF INVENTION

The object of the invention is to produce a conveyer enabling relevant treatment of the loads which is transported on the belt, as required by technology.

The essence of the invention is that a gravity conveyer with an inlet and an outlet and a multi-loop spiral belt mounted around a vertical axis connecting the inlet and outlet is proposed. According to the invention, the belt is designed as a ferroconcrete surface, each loop of which being square shaped in vertical section and along which movable gravity driven carts are mounted to run in a preset trajectory and overhead manipulators detached from said carts. The manipulators travel trajectory is determined by a guide attached to the lower surface of the belt. The carts travel trajectory is determined by a guide attached to the upper surface of the belt. There are technological stations installed along the belt and the carts and manipulators controlled by a programmable magneto-optical system run and stop relative to said technological stations.

BRIEF DESCRIPTION OF DRAWINGS

The invention further is illustrated by the drawings, where.

DETAILED DESCRIPTION OF THE INVENTION

Figure 1:
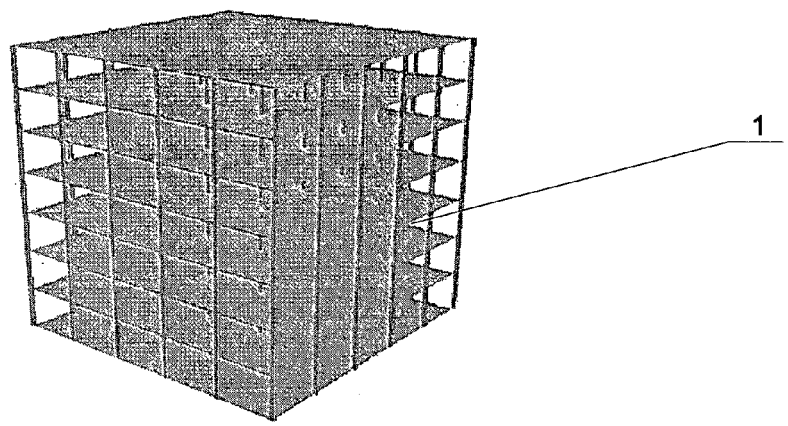
FIG. 1 Sows the multistoried industrial building (separate view)
FIG. 2—the ferroconcrete multi-loop spiral belt (separate view)
FIG. 3—the gravity conveyer in full view
FIG. 4—the gravity conveyer (front view)
FIG. 5—the gravity conveyer (in section A-A)
FIG. 6—the gravity conveyer (in section B-B)
FIG. 7—the gravity conveyer (in section C-C)
Figure 2:
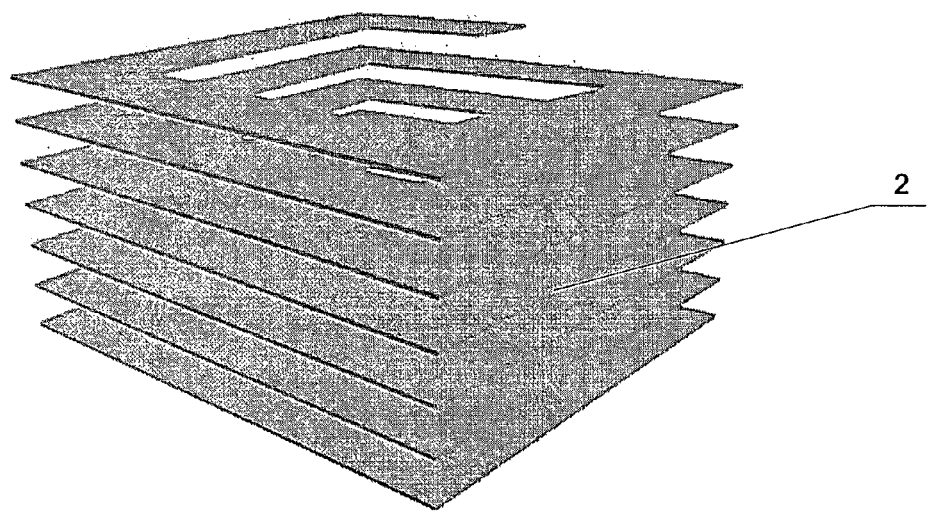
Figure 3:
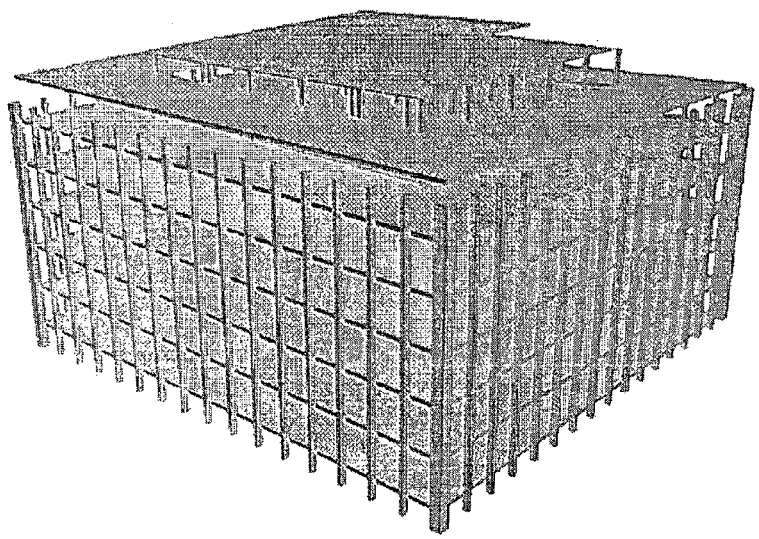
Figure 4:
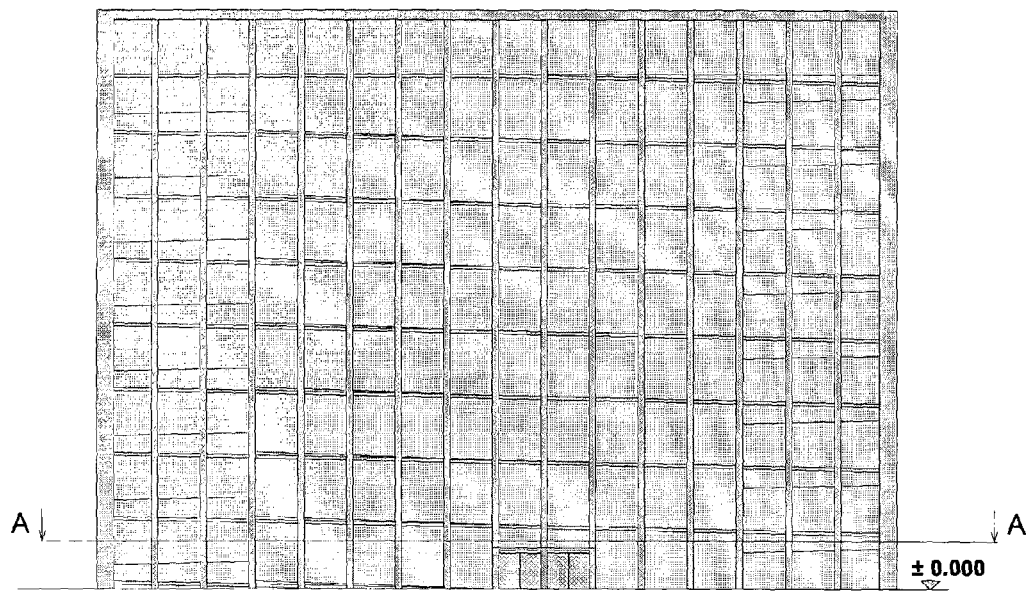
Figure 5:
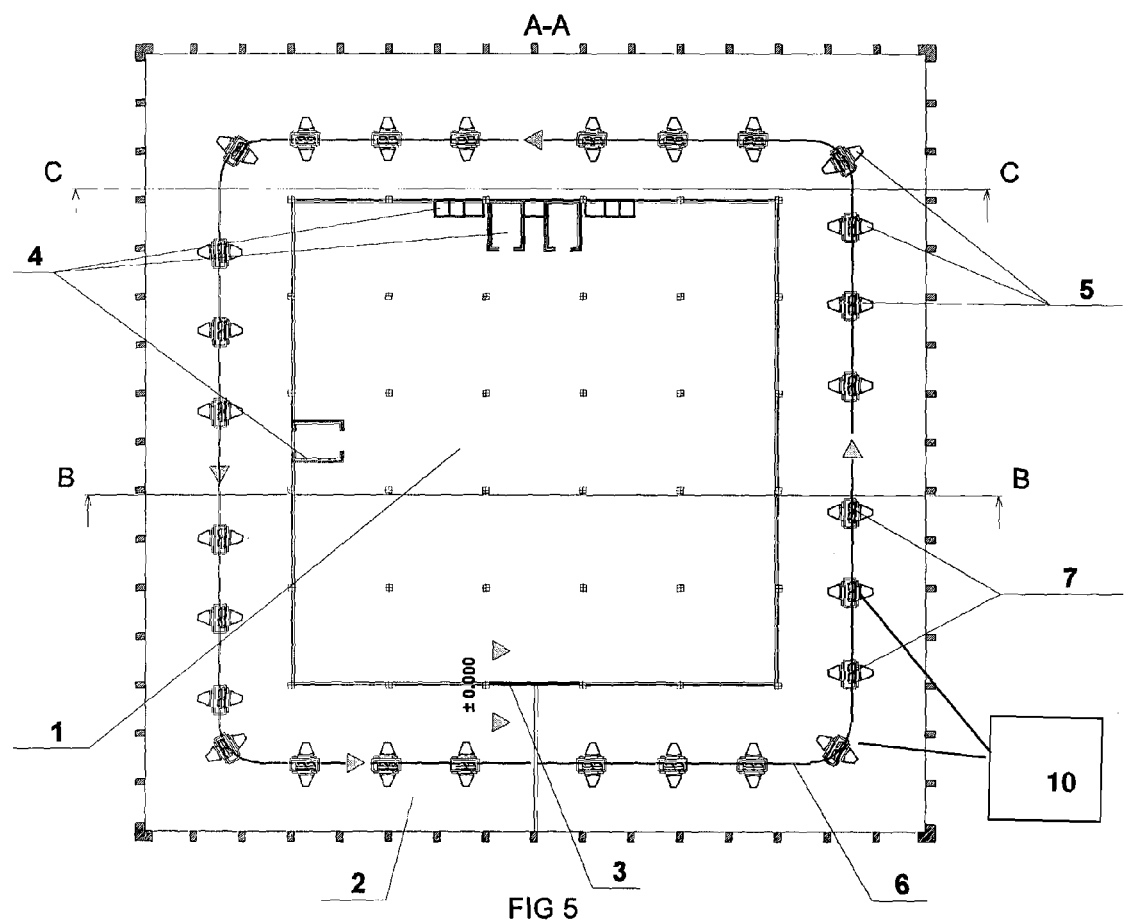
Figure 6:
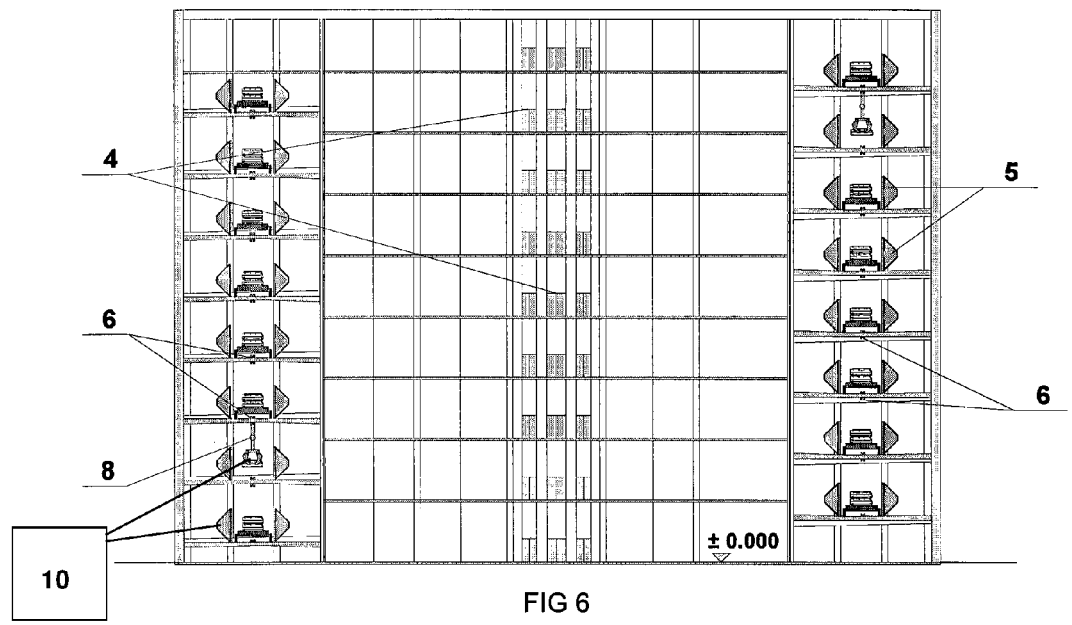
Figure 7:
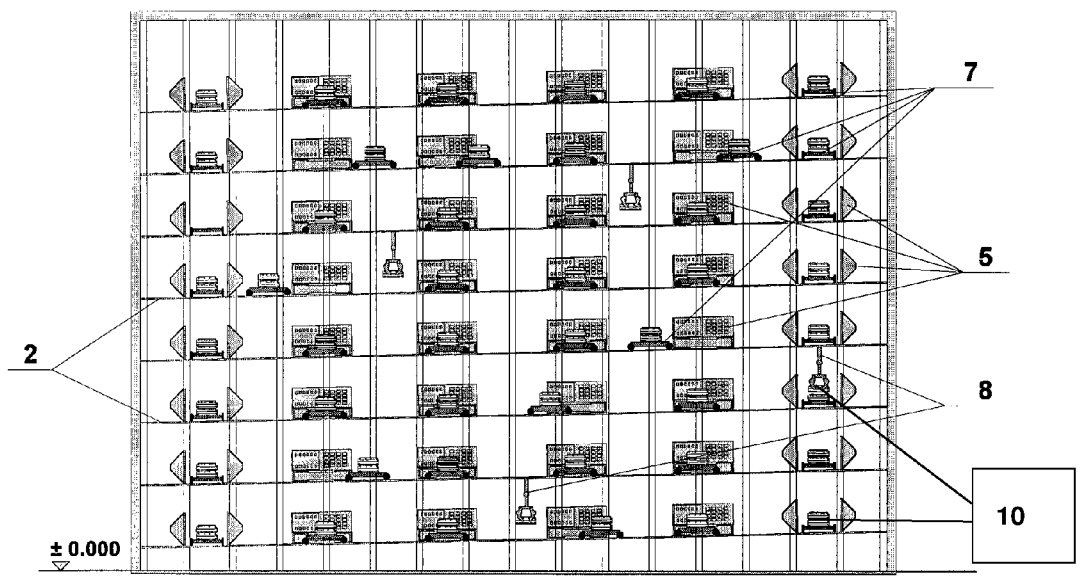

Gravity conveyer is a ferroconcrete multistoried industrial skeleton building with horizontal floors (1) which is square shaped in vertical projection, and a multi-loop spiral ferroconcrete belt (2) is mounted around the external perimeter of said multistoried building the first loop of which starts from ±0,00 point level of the production ground floor (3) and gradually goes upwards to reach to the respective level of the top floor. In other way this multi-loop spiral belt can be described as a system of mounted ramps. The height between loops (ramps) is equal to floor-to-floor height of the building. Each horizontal production floor of each level of the building constructed in accordance with said design as described herein and each loop of multi-loop spiral ferroconcrete belt has one sector of contact. On said sectors of contact they are mounted in a way that each level of production floor and respective ferroconcrete belt area are linked for necessary technological communication. In vertical projection the entire structure also has a shape of a square (in other embodiments it may have a shape of a circle, an ellipse or a regular polygon to meet required technological process). In the pre-determined location of the structure there is a system of multipurpose elevators (4) to deliver required materials and semi-products to any floor to be used for any required production process. The conveyer inlet is located in the section the ferroconcrete belt mounted on the top production floor and runs all way down around the perimeter of building to reach to the ±0,00 point level of the production ground floor where the conveyer terminates its function. To perform all required technological processes of the plant there are technological stations (5) with various machinery and equipment, including robotized ones, installed along the entire spiral surface of ferroconcrete belt (the system of ramps) and said machinery and equipment being grouped in a way to act as technological stations (5). Guides (6) are attached to the upper and lower surfaces of the ferroconcrete belt and said guides run through said technological stations in a preset trajectory. Said guides provide passage of floor wheeled carts and overhead manipulators (7 and 8) though the technological stations. Said carts can move under gravity and the belt (ramps) with insignificantly sloping surface (2°÷7°) ensure movement of the carts downwards the belt. Said insignificant slope of the belt does not create inconvenienced for staff working on the belt, however should ergonomic norms have other requirements there is a possibility to bring the staff workplace area to horizontal position.

The system in combination (the belt and technological stations installed on its surface, floor and overhead cart-manipulators, upper and lower guides) as described herein makes the gravity production conveyer which is fully controlled by a programmable magneto optical system (10) to move, stop and park the cart-manipulators at technological stations and other required spots and synchronize technological processes. Given the production and technological requirements and terms of reference main parameters of the conveyer (width, length, angle of slope, the radius of turn around the corners of the building, the number of stations and their locations, guide trajectory, the number of overhead and floor cart-manipulators and their functions, etc.) shall be determined during the design process. For example, in one of the embodiments, given the production requirements if the conveyer belt must be 3.2 kilometers long, 20 meters wide, the angle of slope of the belt (ramps) must be 2° degrees, then a building with square layout will be designed with one side to be 100 meters long, and floor-to-floor height to be 8.5 meters, and the building must have 8 floors, the total height of the building must be about 70 meters, the total production area will be equal to 80,000 m² .

Technologically the structure as described hereinabove will have the following operational diagram.

The conveyer is the general assembly line of production which work starts from the top floor level and terminates on ±0,00 point level of the production ground floor. During this process products manufactured on each floor of industrial building are delivered to the general conveyer and assembled on the final products transported by the conveyer, in addition to that the stock of products on each floor are intended for the assembly work done on that particular floor. Production process organized in accordance with this diagram significantly reduces energy resources, several times reduces the land area under production, it is very flexible and compact. For example, if necessary every cart can be dismounted from the conveyer, replaced, or undergo additional technological processing on any production floor and returned to the conveyer. Depending on the width of the belt (ramp system) it is possible to install two or more parallel assembly-lines to double the conveyer productivity. In-plant transport may travel on the belt to deliver such products and equipment to production floors for which elevators are not suitable. Should there be any seismic or other restrictions for the height of the building which will limit the length of conveyer then two or more such buildings may be constructed and interconnected by passageways and galleries on the relevant floors to ensure their technological communication.

The invention claimed is:

1. A gravity conveyer, comprising:
    an inlet;
    an outlet;
    a multi-loop spiral belt connecting said inlet and said outlet, said belt being installed around a vertical axis and designed as a ferroconcrete surface, each loop of said belt being square shaped;
    a plurality of gravity driven carts movable along said belt;
    a plurality of overhead manipulators detached from said carts and mounted on said belt;
    a first guide formed on a lower surface of said belt and defining a travel route for said overhead cart manipulators;
    a second guide formed on an upper surface of said belt and defining a travel route for said carts; and
    a plurality of stations, located along said belt along said second guide such that said carts and said overhead manipulators can arrive at said stations.

2. The gravity conveyer of claim 1, further comprising a programmable magneto-optical system controlling said carts and said overhead manipulators to move, stop, and park said carts and said manipulators relative to said stations.

3. The gravity conveyer of claim 1, wherein said second guide lies generally parallel to said first guide.

4. The gravity conveyer of claim 1, wherein said multi-loop spiral belt is mounted around the external perimeter of a multistory industrial skeleton building including a plurality of production floors, and wherein a height between loops of said multi-loop spiral belt is equal to a height between stories in said building.

5. The gravity conveyer of claim 4, wherein said multistory industrial skeleton building comprises at least two buildings, interconnected by passageways and galleries to enable technological communication between said at least two buildings.

6. The gravity conveyer of claim 1, wherein one or more sloping surfaces of said multi-loop spiral belt have an incline in the range of 2-7 degrees.

7. The gravity conveyer of claim 1, further comprising staff workplace areas in said multi-loop spiral belt, wherein said staff workplace areas in said multi-loop spiral belt are horizontal and not sloped.

8. The gravity conveyer of claim 1, wherein said conveyer comprises a general assembly line of production of a product.

9. The gravity conveyer of claim 1, wherein each of said gravity driven carts is removable from said conveyer for maintenance or replacement.

10. The gravity conveyer of claim 1, wherein said conveyer comprises at least two parallel assembly lines.

* * * * *